June 6, 1967     E. A. MALICK     3,323,920
CONCENTRATION OF BEER BY CRYSTALLIZATION AND DISTILLATION
Filed Feb. 25, 1963
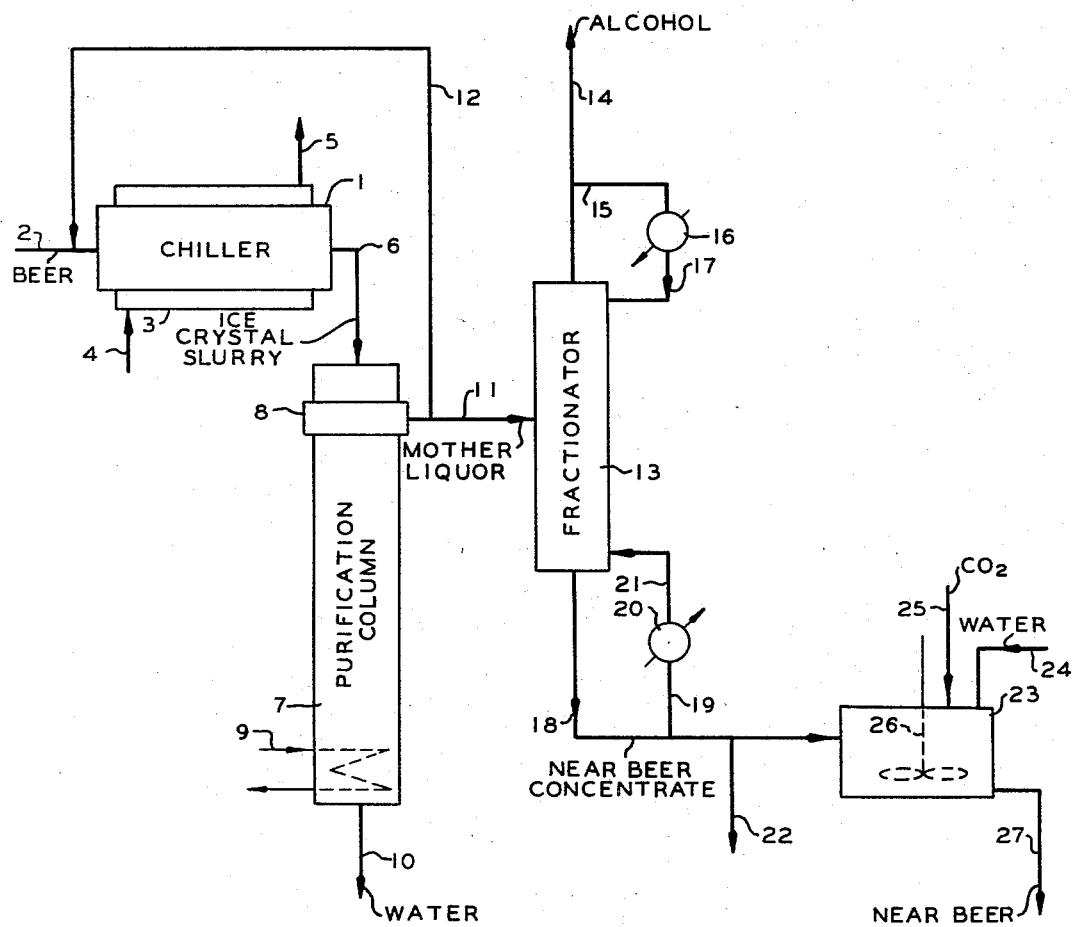
INVENTOR.
E. A. MALICK
BY *Young and Quigg*
ATTORNEYS United States Patent Office 3,323,920
Patented June 6, 1967

3,323,920
CONCENTRATION OF BEER BY CRYSTALLIZATION AND DISTILLATION
Emil A. Malick, Bartlesville, Okla., assignor to Phillips Petroleum Company, a corporation of Delaware
Filed Feb. 25, 1963, Ser. No. 260,529
1 Claim. (Cl. 99—32)

This invention relates to a method for concentrating aqueous solutions by crystallization and distillation. In another aspect, it relates to a method for the preparation of an alcoholic beverage.

Near-beer is conventionally prepared by first making a regular beer and then removing a portion of the alcohol by distillation. It is generally accepted that these near-beers do not have the quality of the regular beer, probably because the distillation of the regular beer results in the degradation and/or removal of some of the flavor and odor components.

Although this discussion will be simplified by primary reference to the preparation of near-beer, it is obvious that the invention is also applicable to any process for the removal of a volatile component more volatile than water from a multi-component aqueous liquid. Thus, the invention is also applicable to the preparation of "near-wine" of low alcohol content as well as other alcoholic beverages where it is necessary to reduce the alcohol content.

It is an object of the invention to provide a process for the concentration of aqueous solutions.

It is another object of the invention to provide a process for decreasing the alcohol content of alcoholic beverages.

Yet another object of the invention is to provide a process for the preparation of near-beer.

It is another object of the invention to provide a process for the concentration of beer by the removal of water and alcohol.

These and other objects of the invention will be readily apparent to those skilled in the art from the accompanying disclosure, drawing and appended claims.

These objects are broadly accomplished by cooling an admixture comprising a multi-component aqueous liquid resolvable by crystallization and containing a component more volatile than water whereby at least a portion of said water freezes to form a slurry of ice crystals in mother liquor, separating said mother liquor from said crystals and distilling said mother liquor to remove at least a portion of the volatile component overhead and recovering the bottoms.

In one aspect of the invention, a near-beer concentrate is produced by cooling beer from fermentation so as to form ice crystals in a mother liquor, resolving said slurry into a water phase and a mother liquor phase by countercurrently contacting the ice crystals with a body of ice crystal melt, withdrawing a water stream, withdrawing mother liquor containing a reduced quantity of water and fractionally distilling the mother liquor so as to remove alcohol overhead and to produce a near-beer concentrate.

In another aspect of the invention, the near-beer concentrate thus produced is reconstituted by the addition of water and/or $CO_2$ if desired.

It is known that aqueous solutions can be concentrated in processes involving freezing to form ice crystals with subsequent separation of the ice crystals from mother liquor. This method of concentrating food products is becoming more and more popular because it can be carried out without damaging the taste of the product. Concentration by crystallization represents a considerable improvement over evaporative processes which rely upon heat or extremely low pressures wherein the removal of water by evaporation also results in removal of the oils and esters, many of which cannot be recovered, so that the concentrated product can never be restored to its original freshness and flavor. Concentration by crystallization can be used to advantage in the processing of such food products and beverages as milk, fruit juices, vegetable juices, vinegar, beer, wine, liquors and the like.

An improved process for the purification of these crystals is disclosed in the patent to R. W. Thomas, U.S. 2,854,494, wherein a mass of crystals to be purified together with accompanying liquid is passed through a purification chamber containing a filter which is integral with the walls of said chamber and positioned at an intermediate part thereof and then through a reflux zone toward a heating means positioned in one end of the chamber, said heating means melting the crystals which arrive in the vicinity thereof. The melt is withdrawn in part as purified product and forced in part into the reflux zone toward the filter due to a pulsating back pressure applied to the contents of the purification chamber by means of a reciprocating piston positioned in a cylinder which is in open communication with said chamber at the end in which said heating means is positioned. The back pressure is sufficient to produce a counterflow of liquid relative to the movement of the crystals. Thus, when the solids are supplied steadily during a given period of time to the purification zone, the reflux or other purifying liquid is moved intermittently in the opposite direction, that is, countercurrently with respect to the solids. The crystals thus treated are highly purified with high throughput rates, improved stability and ease of operation and improved heat distribution.

It has now been found that it is possible to employ a combination of separation by fractional crystallization and separation of components by fractional distillation. It has been found that by first removing the bulk of water (about 70 percent) from the beer or the like by fractional crystallization, especially when employing a purification column such as that of Thomas, supra, that the alcohol may then be subsequently removed from the mother liquor by fractional distillation without significant damage or loss of the sugars, esters and other flavor producing components of the original beer. If desired, this resultant near-beer concentrate may then be reconstituted by the simple addition of water and/or $CO_2$ to provide a near-beer having improved quality. This concentration also greatly reduces packaging, transportation and storage expenses.

The method of manufacture of the beer or other alcoholic beverage is not limiting on the invention and, in the case of beer, would conventionally include such steps as mashing, sparging, brewing, and fermentation. Whatever the product being treated, it would normally be fully prepared prior to the concentration steps of this invention. In the case of beer, however, the concentration process can be combined with filtration to replace lagering. Also, final carbonation could be postponed until after reconstitution and it may be desirable to remove at least a portion of the carbon dioxide which is present in the beer as it comes from the fermentation process.

As illustrated in the drawing, the beer or other multi-component aqueous liquid which is ready for concentration is passed into chiller 1 through conduit 2. In chiller 1, the water is frozen to form a crystal slurry which contains about 20 to 60 percent, preferably 40 to 55 percent, solids. This chilling may be accomplished by any convenient heat exchange means such as the passing of a coolant fluid, such as amomnia, through a jacket 3 by means of conduits 4 and 5. While it is desirable to concentrate as much as possible through the formation of crystal solids, if the solids content is too high, the fluid becomes quite stiff and is difficult to pass through the crystal purification column. In many cases, the chiller and purification column subsequently described will be in one unit but for simplicity of illustration, they have been shown as separate units in the drawing.

The ice crystal slurry from chiller 1 is passed through conduit 6 to crystal purification column 7. This crystal purification column can be any type of purification column but preferably is a pulsed type column such as described in the patent to R. W. Thomas, U.S. 2,854,494. In this type of column, the basic operation is the forcing of a compacted mass of crystals through the column and into a body of melt into the downstream end thereof. This body of melt is formed by melting the crystals through the introduction of heat through the heating means 9, such as heating coils or a steam line. This melting means may also be external of the purification column. The passage of the melt from the column is restricted so that some of the melt is displaced back into the crystal mass as the crystals are forced through the column into the body of the melt. A filter section 8 is provided at an intermediate point in the column so that mother liquor can be withdrawn from the column and separated from the crystals. A portion of the melt which is highly purified water is removed through conduit 10. In general, this will constitute in the range of 50 to 90, preferably 70 to 80, weight percent of the total weight of the original beer. The mother liquor is removed from the filtration section through conduit 11 to the fractionation zone 13. In order to attain some efficiencies in operations and to assure proper concentration, it is also within the scope of the invention to employ a series of chillers and purification columns with mother liquor being passed into a subsequent chiller and purification column. In the drawing which employs a single chiller a portion of the mother liquor is recycled through conduit 12 back to conduit 2.

The water stream removed through conduit 10 contains only a trace of the mother liquor components. The mother liquor containing the remainder of the alcohol and water and substantially all of the original sugars and alcohol is introduced into the fractionator 13. Within this fractionator 13 the alcohol content is reduced to the desired level. In the preparation of near-beer the alcohol content is reduced, for example, from about 3.5 pounds per hundred to 0.5 pound of alcohol based on the original beer. A very small amount of water is also carried overhead.

A major advantage of this system is that the loss of sugars in the distillation step is extremely small since it is necessary to remove so little of the volatile components by distillation. In other words, in the conventional distillation of near-beer it is necessary to remove approximately 91.5 pounds of water and 3 pounds of alcohol out of every hundred pounds of beer by distillation which requires prolonged thermal treatment whereas in the instant process, the distillation stage requires only the removal of approximately 3 pounds of alcohol and 3/10 pounds of water. Obviously, there will be less carryover and degradation of the sugars.

The alcohol is removed overhead along with the small amount of water through conduit 14. If desired, a reflux may be maintained through conduit 15, condenser 16 and conduit 17. The near-beer concentrate is removed from the bottoms through conduit 18 and will contain the desired level of alcohol, substantially all of the original sugars and esters and other flavor causing ingredients, generally 95 to 100 weight percent, and approximately 15 to 30 weight percent of the original bulk. The fractionator is preferably maintained at a temperature in the range of 100 to 150° F. and under a vacuum, such as 3 p.s.i.a., or any other suitable condition such that the alcohol may be removed with a minimum amount of degradation of the sugars. A portion of the near-beer concentrate may be recycled through conduits 19, heat exchanger 20 and conduit 21 into the bottom of the fractionator for reboiling. At this stage, the near-beer concentrate may be consumed or marketed. The ultimate consumer or an intermediate distributor may, if desired, reconstitute the near-beer concentrate by the addition of water and/or $CO_2$. This near-beer concentrate is removed from conduit 18 through conduit 22. However, if desired, the near-beer concentrate may be reconstituted immediately for the production of full strength near-beer by the addition of water through conduit 24 and $CO_2$ through conduit 25 into a mixing chamber 23 employing a mixer 26. Enough water is added to bring the alcohol content to the desired levels, for example less than 0.75 weight percent, preferably 0.3 to 0.75 weight percent. By the process of this invention the sugars will be substantially as they were in the original beer and the amount of water in the reconstituted beer will be slightly more than in the original beer due to the removal of approximately 3 percent alcohol.

The invention is illustrated by the following example. In the example, the reference numerals in the table refer to the reference numerals in the drawing. In this example, a beer from fermentation is introduced into the chiller 1 through conduit 2 wherein the feed is cooled to 13.5° F. to produce a slurry containing 40 percent solids. Based on 100 pounds of fresh feed, 92.8 pounds of mother liquor containing 13.7 weight percent alcohol is recycled from the effluent from the filter section of the purification column 7 through conduit 2 making the total feed to the chiller 192.8 pounds with an alcohol content of 8.4 weight percent. Seventy-five pounds of water are removed through conduit 10 with 25 pounds of mother liquor based on the original 100 pounds being introduced into the fractionator 13. Within the fractionator, which is maintained at a temperature 140° F. and 3 p.s.i.a., 3 pounds of ethyl alcohol are removed along with 0.1 pound of sugar and 0.3 pound of water based on the original 100 pounds. The water removed through conduit 10 is 99.95 percent pure and contains only 0.05 weight percent non-aqueous components including esters, alcohol, and the like. The material balance is shown in the following table.

TABLE I

| Stream Pounds | 2 | 11 | 10 | 14 | 18 | 24 | 27 |
| --- | --- | --- | --- | --- | --- | --- | --- |
| Ethyl Alcohol | 3.5 | 3.5 | | 3.0 | 0.5 | | 0.5 |
| Sugars | 5.0 | 5.0 | | 0.1 | 4.9 | | 4.9 |
| Water | 91.5 | 16.5 | 75.0 | 0.3 | 16.2 | 78.4 | 94.6 |
| Total | 100.0 | 25.0 | 75.0 | 3.4 | 21.6 | 78.4 | 100.0 |

While certain samples, structures, composition and process steps have been described for purposes of illustration, the invention is not limited to these. Variation and modification within the scope of the disclosure and the claim can readily be effected by those skilled in the art.

I claim:

A process for the preparation of near-beer which comprises introducing beer from fermentation having a water content in the range of 90 to 95 weight parts per 100 parts, an alcohol content in the range of 2 to 5 weight parts and a sugar content of about 4 to 6 weight parts based on 100 parts of beer into a cooling zone maintained under conditions whereby slurry of about 20 to 60 weight percent ice crystals is formed in a mother liquor, resolving said slurry into a water phase and a mother liquor phase by introducing said slurry into a purification zone wherein said ice crystals are countercurrently contacted with a body of ice crystal melt formed by melting a portion of said crystals in a downstream portion of said purification zone thus producing a purified water phase, withdrawing a water stream containing about 50 to 90 weight percent of the water in the original beer from the downstream portion of said zone, withdrawing mother liquor from said purification zone, fractionally distilling said mother liquor at a temperature in the range of 100 to 150° F. to remove overhead alcohol and a portion of the remaining water, producing as bottoms a near-beer concentrate having an alcohol content less than 0.75 weight part based on the original 100 weight parts of beer, and a sugar content in the range of 95 to 100 percent of the original sugar content and thereafter reconstituting said near-beer concentrate by the addition of water thereto.

References Cited

UNITED STATES PATENTS

| | | | |
|---|---|---|---|
| 169,818 | 11/1875 | Lockwood | 99—78 |
| 2,854,494 | 9/1958 | Thomas | 62—58 |
| 2,874,199 | 2/1959 | Tarr | 260—666 |
| 2,910,516 | 10/1959 | Rush | 260—674 |
| 3,052,546 | 9/1962 | Riddell et al. | 99—78 |

A. LOUIS MONACELL, *Primary Examiner.*

D. M. STEPHENS, D. M. NAFF, *Assistant Examiners.*